United States Patent
Miller

(10) Patent No.: US 6,733,261 B2
(45) Date of Patent: May 11, 2004

(54) APPARATUS FOR SMOOTH SURFACE GYPSUM FIBERBOARD PANELS

(75) Inventor: David Paul Miller, Lindenhurst, IL (US)

(73) Assignee: United States Gypsum Company, Chicago, IL (US)

( * ) Notice: Subject to any disclaimer, the term of this patent is extended or adjusted under 35 U.S.C. 154(b) by 0 days.

(21) Appl. No.: 10/159,833

(22) Filed: May 31, 2002

(65) Prior Publication Data

US 2002/0145234 A1 Oct. 10, 2002

Related U.S. Application Data

(62) Division of application No. 09/312,471, filed on May 17, 1999, now Pat. No. 6,416,695.

(51) Int. Cl.[7] .............................. B28B 1/52; B28B 3/00
(52) U.S. Cl. ......................... 425/85; 156/346; 162/297; 425/387.1
(58) Field of Search .................... 156/39, 346; 162/207, 162/208, 297; 425/85, 335, 371, 387.1; 264/86, 87, 333

(56) References Cited

U.S. PATENT DOCUMENTS

| | | |
|---|---|---|
| 1,563,095 A | 11/1925 | Lewthwaite |
| 1,989,435 A | 1/1935 | Wallquist |
| 2,156,311 A | 5/1939 | Schuh |
| 3,149,026 A * | 9/1964 | Hornbostel |
| 3,951,735 A | 4/1976 | Kondo |
| 3,989,085 A * | 11/1976 | Crosby |
| 4,657,635 A * | 4/1987 | Kallmes |
| 4,941,949 A | 7/1990 | Luszczak |
| 5,000,227 A * | 3/1991 | Beran et al. |
| 5,320,677 A | 6/1994 | Baig |
| 5,342,566 A | 8/1994 | Schaffer et al. |
| 5,356,481 A | 10/1994 | Yoshimura et al. |
| 5,496,441 A | 3/1996 | Tran |
| 5,520,779 A | 5/1996 | Bold |
| 5,632,848 A | 5/1997 | Richards |
| 2002/0139466 A1 * | 10/2002 | Barnard |

FOREIGN PATENT DOCUMENTS

| | | |
|---|---|---|
| DE | 2365161 A | 7/1975 |
| DE | 3434114 * | 3/1986 |
| EP | 0370703 A1 | 5/1990 |
| JP | 53130719 A | 11/1978 |

OTHER PUBLICATIONS

European Search Report, EP 00 10 9992.
Manson, D.W.; Fourdrinier Papermaking; Pulp and Paper Manufacture, Third Edition, vol. 7, 1991, pp. 192–214, esp. 202–214, The Joint Textbook Committee of The Paper Industry, Atlanta, GA.

* cited by examiner

Primary Examiner—Steven D. Maki
(74) Attorney, Agent, or Firm—Barnes & Thornburg; John M. Lorenzen; David F. Janci

(57) ABSTRACT

An improved method and apparatus for imparting a smooth surface to a gypsum fiber panels. The method involves imparting energy to the surface of the slurry as the slurry is dewatered just prior to rehydration. The apparatus used to impart the energy is an air lance including an air source such as a blower, a distribution manifold and a plurality of nozzles to direct the flow of air at the surface of the slurry. In operation, the air lance directs a flow of air against the surface of the slurry. The flow disrupts the slurry to a fraction of its total depth, thus dispersing clumps or flocs of crystals in the depth that would give the surface of the finished panel a rough surface if they were allowed to remain.

14 Claims, 4 Drawing Sheets

APPARATUS FOR SMOOTH SURFACE GYPSUM FIBERBOARD PANELS

This application is a divisional application of U.S. patent application No. 09/312,471 now U.S. Pat. No. 6,416,695, having a filing date of May 17, 1999.

BACKGROUND OF THE INVENTION

The present invention relates generally to the ability to improve the surface smoothness on composite materials for use in the construction industry. More particularly, the present invention relates to the use of air jets to impart energy to the surface of the material when the composite material is still in a slurry or semi-slurry state where such energy acts to break up flocs or clumps of composite material that otherwise would render a rougher surface on the finished product.

The United States Gypsum Company's gypsum fiberboard process, as shown and described in U.S. Pat. No. 5,320,677, and herein incorporated by reference in its entirety, describes a composite product and a process for producing a composite material in which a dilute slurry of gypsum particles and cellulosic fibers are heated under pressure to convert the gypsum, i.e. calcium sulfate in the stable dihydrate state ($CaSO_4 \cdot 2H_2O$), to calcium sulfate alpha hemihydrate having acicular crystals. The cellulosic fibers have pores or voids on the surface and the alpha hemihydrate crystals form within, on and around the voids and pores of the cellulosic fibers. The heated slurry is then dewatered to form a mat, preferably using equipment similar to paper making equipment, and before the slurry cools enough to rehydrate the hemihydrate to gypsum, the mat is pressed into a board of the desired configuration. The pressed mat is cooled and the hemihydrate rehydrates to gypsum to form a dimensionally stable, strong and useful building board. The board is thereafter trimmed and dried.

One of the many advantages of the process disclosed in the '677 patent is that the surface of the resulting gypsum panel can be smoothed, or in the alternative, textured as the panel is being formed. The challenge in treating the surface of gypsum fiberboard during in-line processing is the timing of the treatment made on the slurry or wet mat. The smoothing as taught in this application begins while the material is still in a slurry or just beginning to form a semi-slurry state.

As the rehydratable calcium sulfate hemihydrate and cellulosic fibers in a slurry form leave the head box, and are disposed upon the conveyor belt or forming wire, the slurry will have a temperature generally in the range of about 200° F. +/−10°. Thereafter, as the slurry is spread to create a forming pond across the conveyor the action of vacuum pumps begins removal of the free water and the temperature drops significantly and the rehydration process begins.

As the slurry exits the head box, the dewatering process begins with the action of vacuum pumps. However, commingled crystals and fibers may collect and form clumps or flocs, which is undesirable at the surface of the product. It is preferred that the clumps or flocs have a greatest dimension less than approximately 6 mm. When rehydrated, clumps of commingled crystals and fibers larger than 6 mm impart an undesirable roughness to the surface of the finished material. Roughness of wet felted products is detrimental to final installations where surface finish is important to final applications, such as painted surfaces (walls) and thin overlays (vinyl laminations). One contributor to such roughness is the condition present in the forming pond during substrate manufacture.

Typically at least two factors increase roughness high consistencies and long fiber content. These are known to be minimized by the addition of water to lower consistencies or by agitation in the slurry pond. Both of these methods though have other undesirable effects. The addition of water adversely affects drainage rates and may cause line speed decreases and increase vacuum demands. Agitation in the pond may adversely affect the preferred form of matrix formation which is collective sedimentation as the slurry is dewatered into a filter cake if the agitation is applied in the wrong stage of formation of the product or at the wrong level in the pond. In addition, if the agitation is used with a slurry having a raw material mix of widely divergent densities or settling rates, such as is common with high filler fine paper or wet process gypsum fiberboard, the lower density material will separate from the higher density material, causing a nonuniform product in the case of the wet process gypsum fiberboard. The separation of materials may also result in a decreasing first pass retention on the forming wire as higher density materials that should remain on the forming table are drawn off by the vacuum boxes during dewatering and returned upstream of the head box for recirculation into the slurry.

A variety of other methods have been attempted to modify forming pond characteristics to improve surface smoothness, such as vibrating rods, vibrating plates, rotating rolls, smooth top plates, water sprays, etc. The use of an air lance directed upstream, but located downstream of the forming pond has yielded the best smoothness with the unexpected result of improved flexural strength.

SUMMARY OF THE INVENTION

The present invention relates generally to producing gypsum fiberboard panels with a smooth surface texture. More particularly, the present invention relates to the use of jets of air to impart a smooth surface texture to gypsum fiberboard panels.

An air knife or air lance with proper pressure, angle of incidence and distance from surface, may be applied in the formation pond of wet felted products, particularly those formed at high consistency, to modify slurry properties during formation and improve properties, in particular surface smoothness of the final panel.

With reference to the '677 patent, energy is selectively applied to the top of the forming pond close to the wet line by an air lance of sufficient energy to disperse clumps in the pond surface and slightly below it, but insufficient energy to disrupt the pond more than slightly below the surface. This energy disperses clumps or flocs during mat formation without disrupting the preferred method of collective sedimentation.

The air lance extends across the forming pond from one side dam to the opposing side dam. The air lance is applied at a low incident angle and so gives much greater flexibility than a water spray, although a water spray is an effective alternative. In addition, the air lance has the advantage over the water spray of no water addition and subsequent required removal by the dewatering process.

One method of generating this air lance is via WINDJET brand nozzles manufactured by Spraying Systems Inc. These nozzles are installed in a manifold to yield a uniform airflow along a two dimensional path. Experimentation with various pressures and flow levels indicated better performance at lower pressure/flow levels. The lower pressures required for optimal results allows the air lance to utilize a blower as a source of air flow rather than more expensive air compressors. Experimentation has also shown an unexpected result of a higher bending strength value in the resulting gypsum fiberboard product.

DETAILED DESCRIPTION OF THE PREFERRED EMBODIMENT

The present invention is directed to a forming system for imparting a smooth surface to gypsum fiberboard panels during their manufacture, and in particular, the use of an air lance to impart a smooth surface on the panels when the panels are still in a slurry or semi-slurry state.

Figure 1:
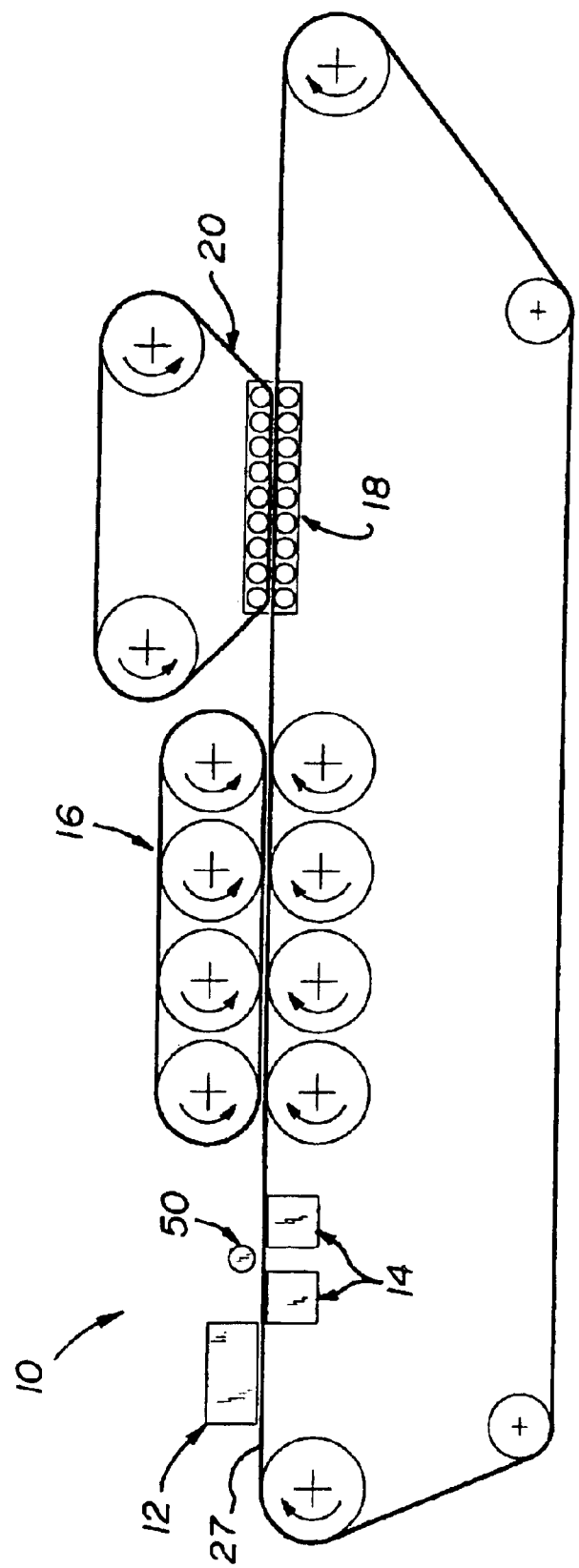
FIG. 1 is a schematic drawing illustrating a production line for forming gypsum fiberboard having a head box, air lance, dewatering vacuums, a dewatering primary press, and a secondary press all for processing a rehydratable gypsum fiber slurry upon a conveyor.

The forming system, generally designated with the numeral 10 and best shown in FIG. 1, includes a head box 12, vacuum boxes 14, an air lance 50, and a wet (primary) press 16 for 1) nipping the filter cake mat to a desired thickness and 2) removing 80–90% of remaining water. The system 10 also includes a secondary press 18 for compressing the board during setting to a calibrated final thickness and aiding in achieving flexural strength in the final product. The secondary press 18 has a continuous belt 20 that also aids in achieving smoothness to the board surface as the rehydrating mat expands against the belt 20.

With reference to the figures, the head box 12 is used to uniformly disperse the calcined slurry having at least about 70% liquid by weight, across the width of the forming table 25, where vacuum boxes 14 are used to dewater the slurry into a mat of generally 28–41% moisture content (wet basis) (40–70% moisture content on a dry basis). The forming table 25 includes side dams 26 to contain the slurry pond and a conveyor or forming wire 27 to move the slurry away from the head box 12 and towards the primary press 16. As the slurry moves along the forming table 25, the vacuum boxes 14 dewater the slurry into a mat, creating a decreasing water content gradient in the slurry going from the head box 12 towards the primary press 16. At some point along this gradient, there is a zone referred to as the wet line, where it is observable that the slurry is changing into the wet mat. Put another way, one can see that the slurry is no longer fluid as the water is removed.

As a result of calcination in a previous step, acicular crystals of calcium hemihydrate were formed in the slurry. If they commingle with the cellulosic fibers into clumps or flocs at or near the surface of the pond of slurry, the clumps or flocs can impart an undesired roughness to the finished product. These clumps or flocs at or near the surface of the slurry may be broken or dispersed by the application of energy to the surface and slightly below the surface of the slurry as the slurry is dewatered. The application of energy also has the unexpected result of increasing the bending strength of the finished composite board. The air lance 50 as described herein is used to impart the energy.

Figure 2:
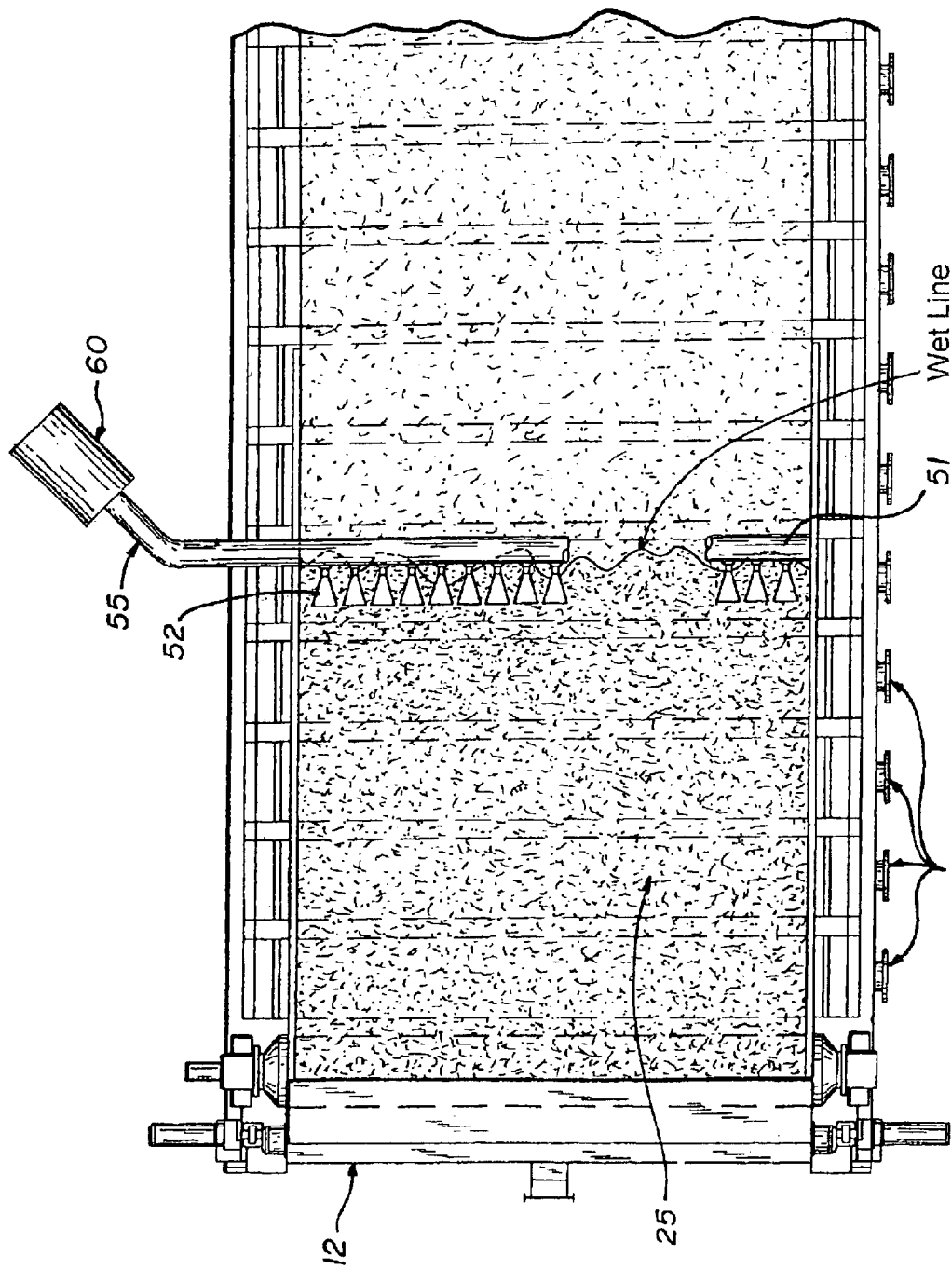
FIG. 2 is an overhead view of the beginning of the forming line, including the head box, forming table containing the slurry pond, and air lance.
Figure 3:
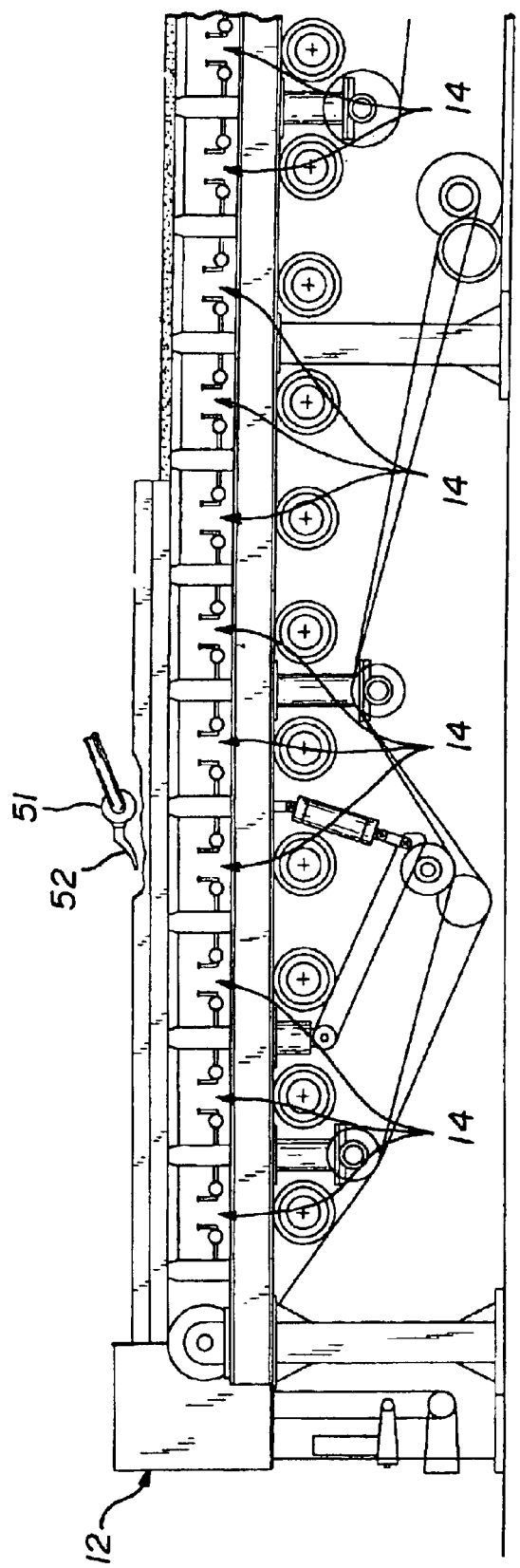
FIG. 3 is a side view of the forming table including the head box, vacuum boxes, side dam, and air lance.
Figure 3A:
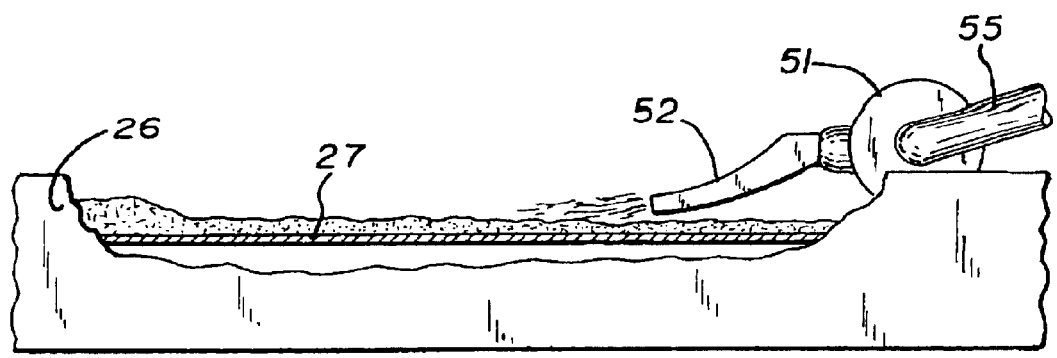
FIG. 3a is a side view of the air lance apparatus including a depiction of the airflow from the air lance to the slurry.
Figure 3B:
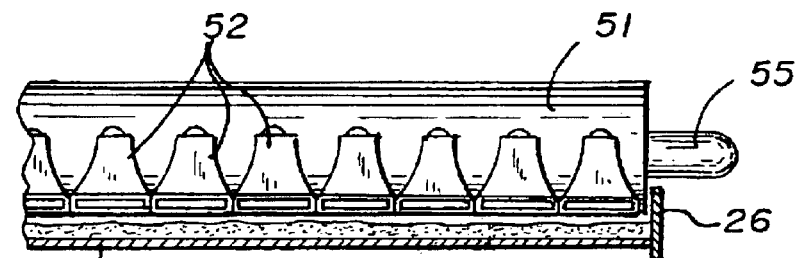
FIG. 3b is a front view of the air lance apparatus.
Figure 4:
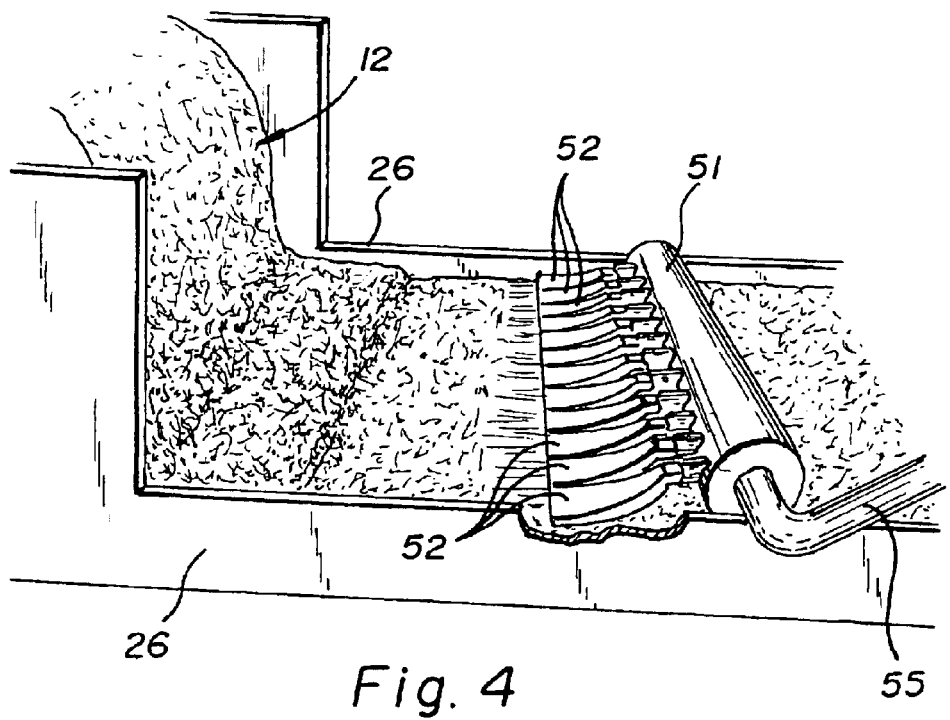
FIG. 4 is a perspective view of the air lance apparatus in operation configured with the WINDJET brand nozzles.

With reference to FIG. 2, the air lance 50 includes a source of air, a conduit 55 or a system of conduits or other means to direct the air from the air source to the nozzles 52 used to direct the air flow upon the slurry. In the preferred embodiment, the air source is a blower 60 with an outlet that provides air at a sufficient pressure such that the pressure at the nozzle outlets is up to 10 psi. Lower pressures have been found to achieve best results in the range of 1–3 psi. The source of air can also be an air compressor, but that implementation is usually less economical. For instance, the outlet of the blower 60 is connected by a conduit 55 to the inlet of a distribution manifold 51. As shown in FIGS. 3b and 4, the distribution manifold 51 has a plurality of outlets for air flow to which the plurality of nozzles 52 are attached. The nozzles 52 in the preferred embodiment are WINDJET brand nozzles manufactured by Spraying Systems Inc., but other directional means may be used.

The manifold 51 and nozzles 52 are positioned above the forming table 25 at the wet line in an orientation such that the long axis of the manifold 51 is generally across to the wet line. Due to the nature of the slurry pond as it experiences vacuum extraction of water on the moving conveyor 27, the wet line is irregular and not a straight line, as would be clear to those skilled in the art. As shown in FIG. 4, the air flow is directed at the surface of the slurry by the nozzles 52 counter current of the conveyor, that is towards the head box 12. With this arrangement, the air flow from the nozzles 52 is directed at the surface of the slurry in a zone which includes an area where the slurry is still fluid. The air flow then disrupts the surface of the slurry pond to a fraction of its entire depth and in doing so, breaks up the undesirable clumps or flocs in that fraction of the depth so their greatest dimension is less than about ¼ inch (6 mm) and desirably no greater than 2–3 mm. By varying the rate of air flow and the angle at which the air strikes the surface of the slurry pond, differing degrees of smoothness are obtained. It has been found that the best results are obtained when the air flow is directed at the surface of the slurry at an angle no greater than about 10 degrees with reference to the plane of the slurry. It has also been found that the low pressure air flow yields superior results when compared to a high pressure airflow over 10 psi; but the air flow should be sufficient enough to impart energy or disrupt the slurry to about one-tenth of the entire depth of the slurry. Energy may be imparted to a depth greater than one-tenth of the entire depth, but doing so does not further improve the surface smoothness of the finished product and may adversely affect formation and subsequent strength. Energy may also be applied to a depth less than one tenth of the depth of the slurry, but less than optimal results are obtained.

After the air lance 50 is applied, the manufacturing process may continue as generally described in the '677 patent. In the preferred embodiment, the slurry pond is further dewatered and formed into a filter cake after it passes the air lance 50 by the application of additional vacuum boxes 14. With reference to FIG. 1, the conveyor or forming wire 27 carries the filter cake to the primary press 16 which further dewaters the filter cake and nips the material to a desired thickness. The board exits the primary press 16 and is carried on the conveyor 27 to the secondary press 18. The secondary press shapes the board to a final calibrated thickness. During this time, the board begins setting and expands to fill the nip gap. The board expands against the smooth belt 20 of the secondary press 18 which further aids in rendering a smooth surface and increased flex strength.

Various features of the invention have been particularly shown and described in connection with the illustrated embodiments of the invention. However, it must be understood that these particular arrangements, and their method of manufacture, do not limit but merely illustrate, and that the invention is to be given its fullest interpretation within the terms of the appended claims.

What is claimed is:

1. An apparatus for treating the surface of a settable composite while the settable composite is in a slurry state, comprising:

a forming table adapted to remove water from the slurry and to convey the slurry;

an air source to supply a flow of air; and a plurality of nozzles connected to the air source and positioned above the pond of slurry to direct the flow of air onto the surface of the moving slurry only in a direction counter to the slurry's direction of conveyance.

2. The apparatus of claim 1, where the nozzles direct the flow of air at an angle of 10 degrees or less in relation to a surface plane of the slurry.

3. The apparatus of claim 1, where the source of air is a blower.

4. The apparatus of claim 1, where the air flow is sufficient to impart energy to the slurry to a depth of one-tenth of said slurry's depth.

5. The apparatus of claim 1, where the settable composite includes acicular calcium sulfate hemihydrate crystals and host particles of a fibrous reinforcement material, the flow of air being sufficient strength to break up flocs of said crystals and fibrous reinforcement material.

6. The apparatus of claim 1, where the settable composite includes crystals and fibrous reinforcement material, the flow of air being of sufficient strength to break up flocs of said crystals and fibrous reinforcement material.

7. The apparatus of claim 5, where the flow of air disrupts the slurry to a fraction of the slurry's depth.

8. The apparatus of claim 1, where the slurry forms a wet line, said nozzles positioned above said wet line.

9. An apparatus for breaking up flocs of commingled fibrous reinforcement material and acicular calcium sulfate hemihydrate crystals in a fiber board forming line, the apparatus including:

a forming wire for transporting a pond of slurry, an air source to supply a flow of air, a plurality of nozzles connected to the air source, the nozzles fixed in position to direct the flow of air onto the pond of slurry, to disrupt the slurry below the pond surface, so as to break up the flocs.

10. The apparatus of claim 9, wherein the flow of air disrupts the pond of slurry to a fraction of its depth.

11. The apparatus of claim 9, wherein the flow of air disrupts the pond of slurry to a depth of at least one-tenth of the depth of the pond of slurry.

12. The apparatus of claim 9, wherein the nozzles are positioned to direct the flow of air in a direction counter to the direction of transport of the pond of slurry.

13. The apparatus of claim 11, wherein the nozzles direct the flow of air at an angle of up to 10 degrees with reference to the surface of the pond of slurry.

14. A system for producing a smooth surface set board from a settable slurry composition comprising:

a mixer for mixing a slurry of a settable composite having floc-forming materials therein;

a conveyor for receiving the slurry from the mixer and conveying the slurry there-along;

a vacuum-creating apparatus arranged with the conveyor for drawing moisture from the slurry;

a plurality of pressurized-air fed nozzles pointing upstream of and positioned above the conveyor for directing air flow against the slurry to break-up flocs near the surface of the slurry.

* * * * *